Feb. 18, 1969  H. IMGRUND  3,427,905

AUTOMATIC LATHE

Filed July 7, 1966 Sheet 1 of 2

INVENTOR.
Heinrich IMGRUND
BY Kenwood Ross
ATTORNEY.

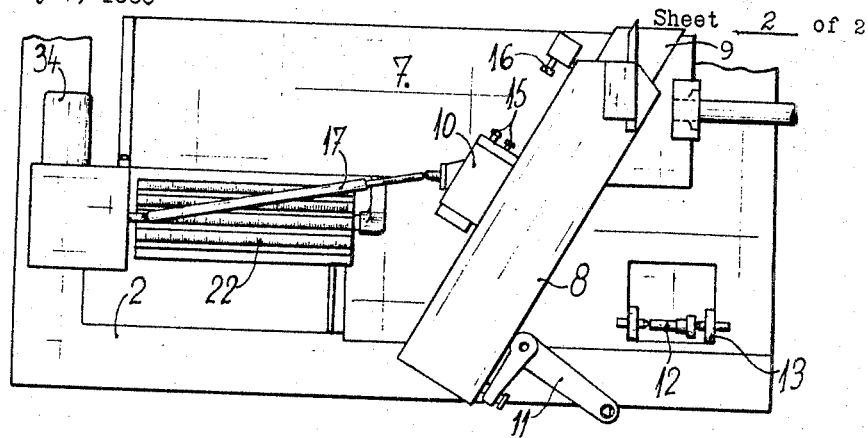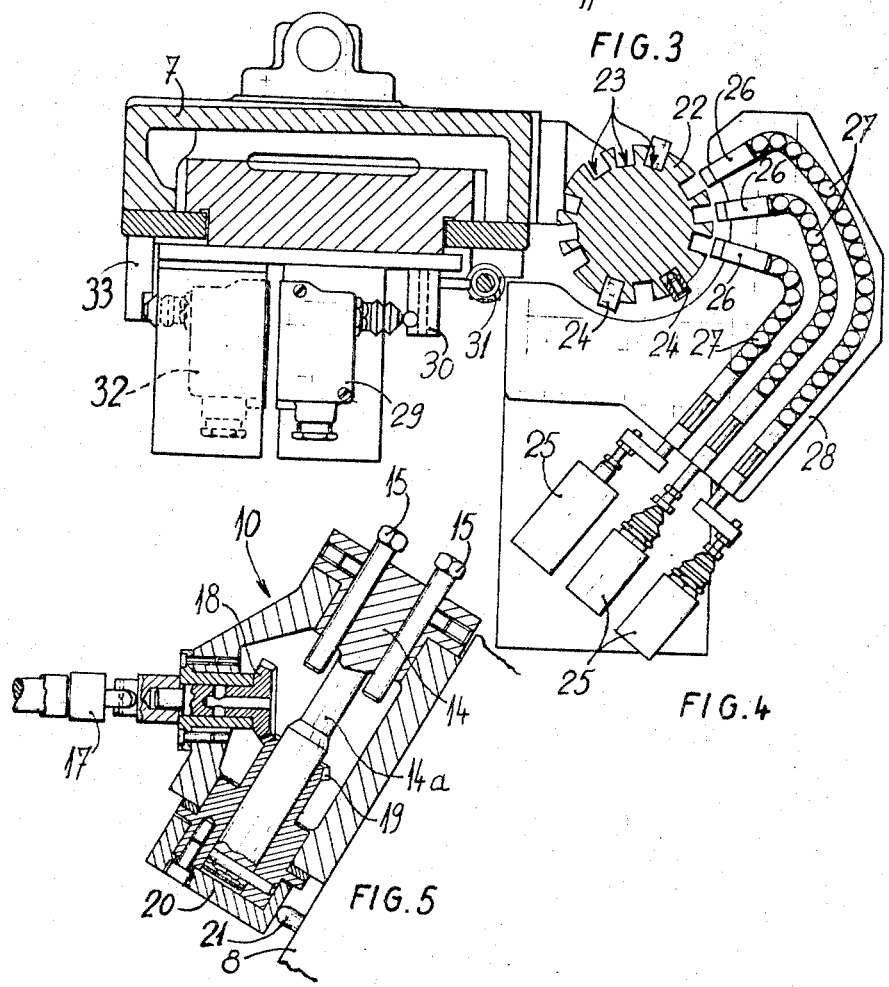

United States Patent Office 3,427,905
Patented Feb. 18, 1969

3,427,905
AUTOMATIC LATHE
Heinrich Imgrund, Geneva, Switzerland, assignor to Tarex S.A., Geneva, Switzerland, a firm of Switzerland
Filed July 7, 1966, Ser. No. 563,527
Claims priority, application Switzerland, Aug. 31, 1965, 12,189/65
U.S. Cl. 82—14
Int. Cl. B23b 3/28
6 Claims

ABSTRACT OF THE DISCLOSURE

In an automatic lathe comprising, a multi-cut hydraulic copying device mounted on a carriage, a stop arrangement which determines the strokes and speeds of said carriage, a device limiting the depth of cut of said copying device, and an indexing mechanism connected on the one hand to said device limiting the depth of cut of the copying device and on the other hand to said stop arrangement, whereby the indexing of the said limiting device and stop arrangement is thus synchronized, a first shaft terminating at said limiting device, a Maltese cross on said first shaft, a second shaft terminating at said stop arrangement, a Maltese cross on said second shaft, said indexing mechanism including a control shaft, a motor rotating said control shaft, a plate mounted on said control shaft, and at least one driving pin on said plate acting in succession on said two Maltese crosses, in such manner as to actuate both of them in step.

---

Figure 1:
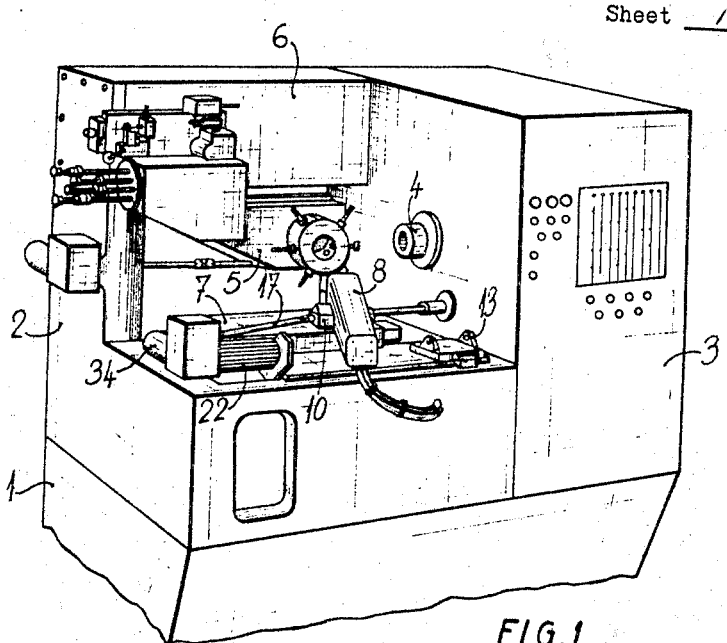

The object of the invention is the provision of an automatic lathe including a multi-cut hydraulic copying device mounted on a carriage.

The automatic lathe according to the invention is characterized by the fact that it comprises an indexing mechanism connected on the one hand to a stop arrangement which limits the depth of the cuts of the copying device and on the other hand to a stop arrangement which determines the strokes and speeds of said carriage, the indexing of said two stop arrangements thus being synchronized.

Figure 2:
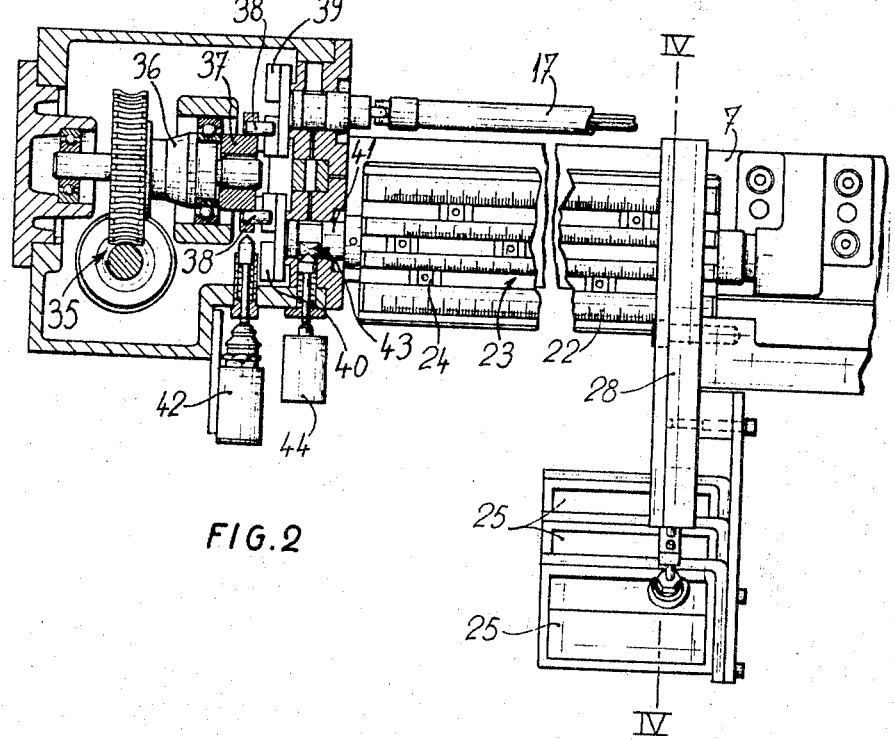

The accompanying drawings show, my way of example, one embodiment of the invention. In the drawings:

FIGURE 1 is a view in perspective of a single-spindle automatic lathe with a revolving head, FIGURE 2 is a fragmentary view of the lathe partly in elevation and partly in section, and shown on a larger scale, FIGURE 3 is a fragmentary plan view of the lathe, FIGURE 4 is a cross-section on the line IV—IV of FIGURE 2, and FIGURE 5 is a section of a detail, shown on a larger scale.

The automatic lathe shown comprises a base 1, a bed 2 and a headstock 3. The spindle is denoted by 4. The lathe comprises, in addition to a carriage with revolving turret 5 suspended from a beam 6, a front carriage 7 carrying a multiple-cut hydraulic copying device 8. The latter moves along a slide 9 on the carriage 7, the said slide being oblique in relation to the longitudinal axis of the carriage.

The copying device 8 comprises on the one hand a stop arrangement 10 employed for rough turning (FIGURES 3 and 5) and on the other hand a feeler 11 which cooperates with a templet 12, shown in FIGURE 3, fixed removably in a templet-holder which is itself mounted on the bed 2 (FIGURES 1 and 3).

The stop arrangement 10 comprises a barrel 14 having four positions and carrying stops 15 the axial positions of which are adjustable, these stops determining the depth of the rough turning cuts by coming into abutment with a buffer 16 mounted on the carriage 7. The indexing of this arrangement, that is the rotation of the barrel 14, is controlled by a shaft 17 carrying a bevel gear 18 meshing with a bevel gear 19 keyed to a shaft 14a of the barrel 14. The shaft 17 is rotatably driven by means which will be described hereinafter.

At its rear end the shaft 14a also carries a cam 20 intended to act on the feeler 11 through the agency of a control device of which only a pushrod 21 is illustrated (FIGURE 5) so as to modify the position of the feeler in relation to the body of the copying device 8 and thus to allow the finish-copying to be carried out in two successive cuts, at slightly different depths by means of the same templet.

Depending upon the pieces of work to be machined, it will be possible to carry out one, two or even three preliminary machining operations producing a rough turned cylindrical piece of work, then one or even two operations of finish-copying, which are carried out when none of the stops 15 are in abutment with the buffer 16.

The carriage 7 has a stop-supporting drum 22 thereon which is provided with four groups of three longitudinal grooves 23 into which are placed pegs 24 intended to actuate three micro-contacts 25 (FIGURES 2 and 4), the first determining the changeover from the rapid forward speed of the carriage to its working feed speed, the second determining the stopping of the carriage at the end of its feed strokes and of its withdrawal, and the third any other function of the machine that may have to be controlled in passing by the carriage 7. It should be noted that the drum 22 carries graduated scale serving to mark off the position of the pegs 24. These graduations are such that they can be read off directly, that is to say they indicate directly the distance between the spindle nose and the tool carried by the copying device at the moment the operation controlled by each of the pegs 24 is set in motion.

The three micro-contacts 25 are actuated by pushrods 26 which are themselves controlled by the pegs 24, the pushrods acting through the agency of devices 27 comprising ball transmissions. These pushrods and the ball transmission devices are carried by a plate 28 fixed to the bed 2 (FIGURES 2 and 4).

The stopping of the carriage 7 at the end of a return stroke is ensured by a micro-contact 29 controlled by a lever 30 having two arms and itself actuated by a stop 31 constituted by a tube mounted so as to be adjustable on the carriage (FIGURE 4). A second micro-contact, denoted by 32 and controlled by a stop 33 on the carriage 7, effects the stopping of the carriage in the furthermost position of the return stroke, more especially in order to facilitate access to the revolving turret head when the machine is being adjusted.

The indexing of the drum 22 with its stops is controlled, in timed relation with the indexing of the barrel of the copying device, by a motor 34 (FIGURE 1) which through a worm 35 (FIGURE 2) actuates a shaft 36 carrying a plate 37 provided with two driving pins 38 which are diametrically opposed. These two driving pins act in succession, at each half-revolution of the shaft 36, upon two Maltese crosses 39 and 40 which are juxtaposed and are carried, the first by the shaft 17 controlling the barrel of the copying device 14, and the second by the shaft denoted by 41 which drives the drum 22. Thus, each half-revolution of the shaft 36 corresponds to a quarter-revolution of the drum 22 and of the barrel 14. A micro-contact 42 controlled by the plate 37 acting as a cam stops the motor 34 at each half-revolution of the shaft 36, that is after each indexing operation.

Finally, the shaft 41 has a half-flat portion 43 which acts upon micro-contacts 44 each time the drum 22 completes one full revolution and so supplies the indication required for a fresh operating cycle of the machine to be initiated.

It should be noted that the shaft 17 has universal joints and is telescopic, so as to render the movements of the copying device 8 possible.

As a variation, the case could be envisaged in which the stops 15 on the barrel 14 might be dispensed with and the cam 20 provided with several swells, thereby allowing machining to be carried out directly, without rough turning operations involving stops, the latter being replaced by copying cuts.

What I claim is:

1. In an automatic lathe comprising a multi-cut hydraulic copying device mounted on a carriage, a stop arrangement which determines the strokes and speeds of said carriage, a device limiting the depth of cut of said copying device, and an indexing mechanism connected on the one hand to said device limiting the depth of cut of the copying device and on the other hand to said stop arrangement, whereby the indexing of the said limiting device and stop arrangement is thus synchronized, a first shaft terminating at said limiting device, a Maltese cross on said first shaft, a second shaft terminating at said stop arrangement, a Maltese cross on said second shaft, said indexing mechanism including a control shaft, a motor rotating said control shaft, a plate mounted on said control shaft, and at least one driving pin on said plate acting in succession on said two Maltese crosses, in such manner as to actuate both of them in step.

2. In an automatic lathe as claimed in claim 1, including, two driving pins on said plate which are diametrically opposed and act simultaneously each on one of said two Maltese crosses, in such manner as to actuate both of them in step.

3. In an automatic lathe as claimed in claim 1, including a motor rotating said control shaft, and a switch for stopping said motor, said switch being actuated by said control shaft at every half-revolution thereof, whereby stopping of the indexing mechanism is effected at every quarter-revolution of said limiting device and stop arrangement.

4. In an automatic lathe as claimed in claim 1, wherein said copying device includes a body and a feeler, and said limiting device includes a cam, said cam acting on said feeler in such manner as to displace it in relation to said body of the copying device whereby to modify the depth of the finishing cuts which can thereby be carried out by means of one and the same templet.

5. In an automatic lathe as claimed in claim 4, including stop means on said limiting device, a barrel integral with the copying device and movable therewith, said stop means being mounted on said barrel, and an immobilizing element mounted on the carriage, said stop means cooperating with said immobilizing element for the purpose of determining the depth of cut in rough turning operations.

6. In an automatic lathe as claimed in claim 1, wherein said first shaft terminating at said limiting device is telescopic and has universal joints thereon.

References Cited

UNITED STATES PATENTS

| 708,858 | 9/1902 | Brown | 90—56.1 |
| 1,361,883 | 12/1920 | Littman | 90—56.1 |
| 2,360,375 | 10/1944 | Tutiya | 82—14.2 |
| 2,648,237 | 8/1953 | Fulconi | 82—34.4 |
| 3,215,011 | 11/1965 | Findeis | 82—14 |

FOREIGN PATENTS

| 318,293 | 7/1918 | Germany. |
| 421,657 | 4/1967 | Switzerland. |
| 1,036,639 | 7/1966 | Great Britain. |

GERALD A. DOST, *Primary Examiner.*

U.S. Cl. X.R.

82—34; 33—181; 90—56